R. DENISON.
Mill Bolt.
No. 45,142.
Patented Nov. 22, 1864.
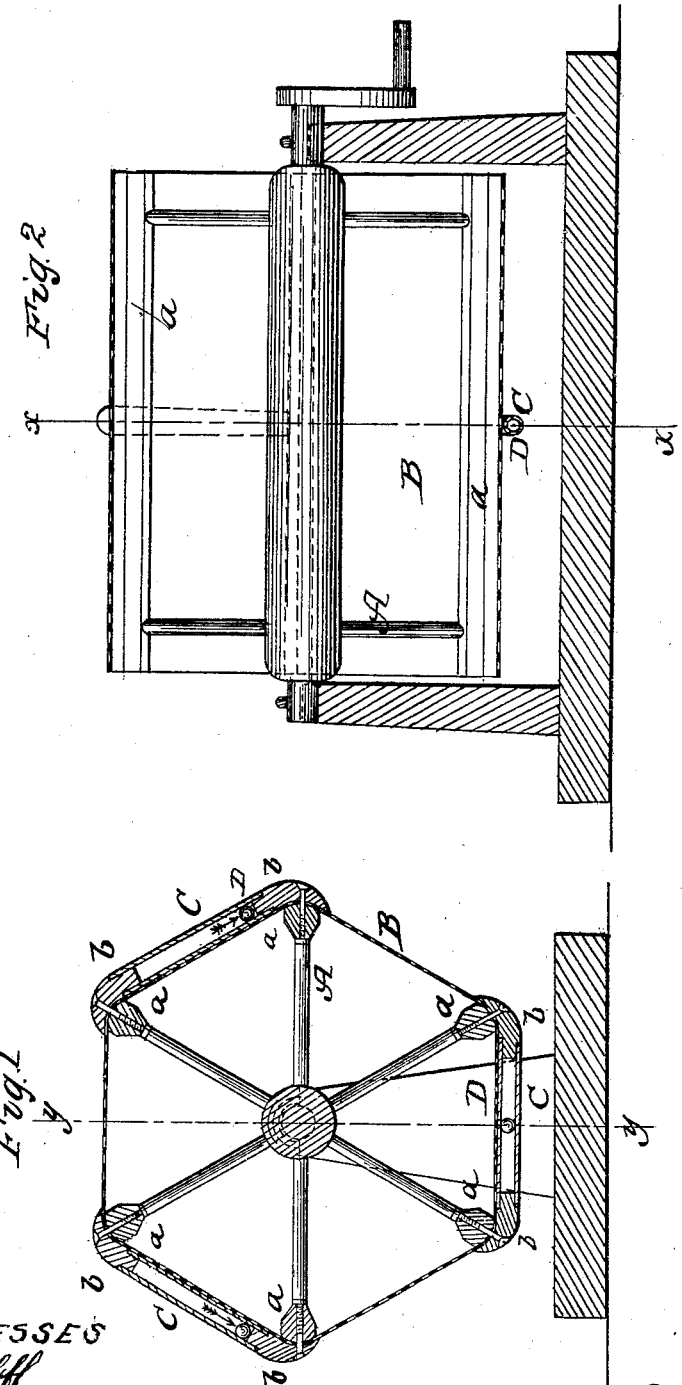

UNITED STATES PATENT OFFICE.

ROSWELL DENISON, OF GRAND RAPIDS, MICHIGAN.

IMPROVEMENT IN BOLTS IN GRINDING-MILLS.

Specification forming part of Letters Patent No. 45,142, dated November 22, 1864.

*To all whom it may concern:*

Be it known that I, ROSWELL DENISON, of Grand Rapids, in the county of Kent and State of Michigan, have invented a new and useful Improvement in Bolts for Flour-Mills; and I do hereby declare that the following is a full, clear, and exact description thereof, which will enable others skilled in the art to make and use the same, reference being had to the accompanying drawings, forming part of this specification, in which—

Figure 1 represents a transverse vertical section of my invention, taken in the line $x\ x$, Fig. 2; Fig. 2, a longitudinal vertical section of the same, taken in the line $y\ y$, Fig. 1.

Similar letters of reference indicate like parts.

This invention relates to a new and improved means for knocking or jarring flour-bolts during the operation of bolting, in order to favor the passage of the flour through the bolting-cloth and prevent the latter from choking or clogging.

To this end, the invention consists in the employment or use of balls placed in tubes attached to the frame of the bolt, and arranged in such a manner that each ball will, as the bolt rotates, produce two jars or concussions during each revolution of the bolt, and thereby operate in the most efficient manner.

A represents the frame of the bolt, which may be constructed, in the usual manner, of polygonal form, and covered with bolting-cloth B. The bolt is suspended or hung as usual, so that it may rotate freely, and to the ribs or longitudinal bars $a$ of the bolt-frame there are secured projections $b$, which are in line with each other circumferentially on the bolt frame, and have the ends of the tubes C fitted on them, as shown clearly in Fig. 1. Within each tube C there is placed a metal ball, D. These balls are a trifle smaller in diameter than the interior of the tubes, so that they may roll freely therein. The tubes and balls may be of any suitable dimensions. One or more rows of tubes C may be employed, as required, and a tube may extend across every side of the bolt or across alternate sides. The latter plan is shown in Fig. 1.

From the above description it will be seen that as the bolt is rotated each ball D will fall within its tube the whole length of the same twice during each revolution of the bolt, and the concussion or jar produced by the balls coming in contact with the projections $b$, on which the ends of the tubes are fitted, will keep the bolting-cloth in an open state, favoring the passage of the flour through it and effectually preventing it from choking or clogging. The balls fall within their tubes at opposite sides of the bolt-shaft, as indicated by the arrows in Fig. 1.

I would remark that the tubes C may be placed at either the exterior or interior of the bolt. I prefer the former place, and, in consequence of the balls acting upon the bolt as described, they operate much more efficiently than the ordinary knockers employed for the purpose.

I claim as new and desire to secure by Letters Patent—

The employment or use of a series of tubes containing balls or other shaped weights and applied to the bolt, to operate in the manner substantially as and for the purpose herein set forth.

ROSWELL DENISON.

Witnesses:
JAMES M. BARNETT,
JOHN ROOKE.